United States Patent Office 2,779,647
Patented Jan. 29, 1957

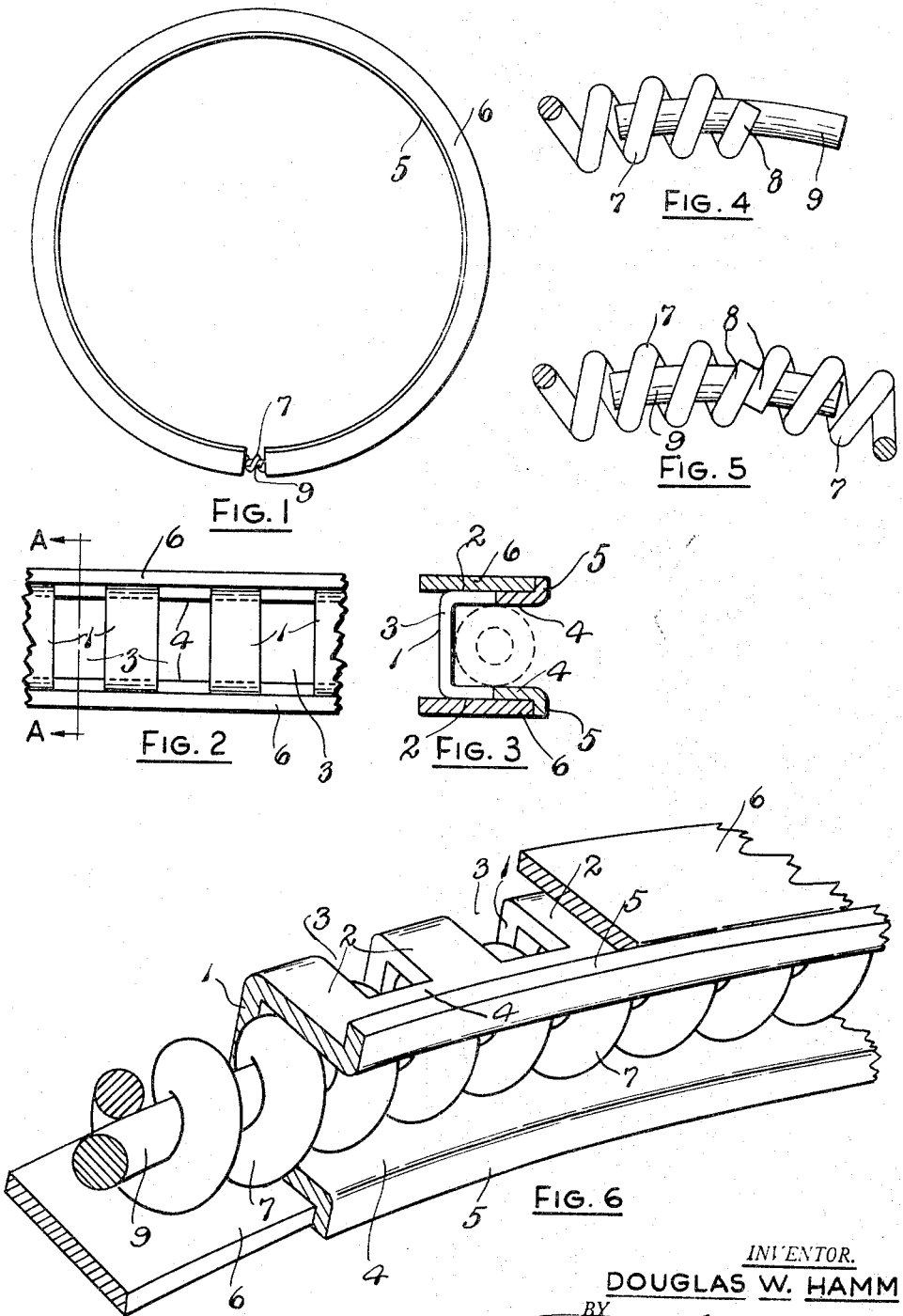

2,779,647
PISTON RING

Douglas W. Hamm, Muskegon, Mich., assignor to Muskegon Piston Ring Company, Muskegon, Mich., a corporation of Michigan Application December 10, 1953, Serial No. 397,403

1 Claim. (Cl. 309—44)

This invention relates to a novel, economical and particularly effective oil ring for pistons, adapted to be used both as original equipment on an engine assembly line and also for replacement purposes.

It is an object and purpose of the present invention to provide a piston ring which has such structure as to facilitate one-piece assembly but with an assurance of independent multi-piece action. Moreover, a uniform and constant radial pressure is obtained, the ring is vented for the passage of excess oil therethrough, the parts of the ring are easily manufactured economically, and installation on a piston is certain of being correctly done. Also the ring may be used in ring grooves of any type, the open back type, those with minimum groove side width and those with substantially closed back. The steel rails which are parts of the piston ring with outer edges which bear against a cylinder wall in use within a cylinder are supported on both sides for the greater portion of the areas thereof with the advantages which come from such support.

An understanding of the invention may be had from the following description taken in connection with the accompanying drawing, in which, Fig. 1 is a plan view of the piston ring made in accordance with my invention.

Fig. 2 is a fragmentary enlarged elevation looking at the outer side of the ring.

Fig. 3 is a transverse vertical section substantially on the plane of line A—A of Fig. 2.

Figs. 4 and 5 are views showing the manner in which the inner spring, the force of which will normally expand the ring and cause the steel rails thereof to bear against the cylinder wall, is held at the meeting ends thereof in proper abutting relationship to each other, and Fig. 6 is a fragmentary, further enlarged, perspective view of the assembled ring made in accordance with my invention, the view being taken looking downwardly and against the inner curved side of the ring, parts being broken away and shown in section for better disclosure.

Like reference characters refer to like parts in the different figures of the drawing.

A piston ring made in accordance with my invention includes an intermediate spacer between upper and lower steel rails which are used therewith. Such spacer is made of thin sheet metal and is of generally channel form in cross section having an outer vertical web and inwardly extending flanges. The vertical web is vented, as by spaced slots therethrough and through adjacent portions of the flanges, so that the web of the spacer includes a plurality of spaced vertical web sections 1 with inwardly extending sections 2 of the same width, the adjacent sections 1 and 2 being spaced from each other by vertical slots 3 in the channel web extending into its flanges. The sections 2 have integral connection with the remaining portions 4 of the flanges which, at their inner edges, are bent outwardly in terminal continuous lips 5. The venting of the channel spacer member is not restricted to the vertical slots 3 shown but may take many other forms so long as openings of sufficient size and number are provided for the ready flow of oil scraped from a cylinder wall therethrough to the bottom of ring grooves, from which it passes through passages to the interior of the piston.

Over the uppermost flange 4 and the spaced sections 2 thereof and under the lower flange 4 and its associated sections 2, flat thin steel rails 6 are placed, the inner edges of which come against the terminal lips 5. The outer sides of the rails 6 and the free edges of the lips 5 may lie in the same planes or such outer sides of the rails may be located slightly beyond or slightly inside the free edges of such lips.

It is to be understood that the thin steel rails 6 are parted at one side for opening to pass over a piston and the spacer likewise will be similarly parted for the same purpose. Within the channel of the spacer and between the upper and lower flanges thereof a spring shown as a continuously coiled wire spring 7 is received. Its two end coils 8 (Figs. 4 and 5) come against each other, and may be squared to abut securely against each other. To insure that the end portions of the spring member 7 will not get out of proper alignment I sometimes use a length of wire rod 9, the exterior diameter of which is substantially the same as the inner diameter of the spring coils, which, as shown in Fig. 4 is inserted, at one end portion of said spring into the coils at its parting, extending thereinto for a desired distance and then the end coils for the opposite end of the spring are telescoped over the projecting end of the wire rod 9. Such rod, as shown in Figs. 4 and 5, will be of desired length, not necessarily that shown in the drawing, its exact length thereof not being of any particular or critical importance in conjunction with the present invention. Preferably, some of the coils will snugly engage the wire rod 9 with some gripping to insure against any unwanted movement of the rod through the spring, or any sufficient movement to move it from the position shown in which it bridges the parting between the two ends of the coiled spring member 7.

In the assembly of the ring, the rails 6 are located at the outer sides of the flanges 5 and sections 2 thereof, extending outwardly therefrom and may be either free or cemented thereto, the ring structure lending itself to facilitate such cementing. The cementing is of a type which will securely hold the rails in position when the rails are at normal atmospheric temperature, but upon being subjected to lubricating oil and the high temperature which follows from engine operation, it is softened and shortly disappears, being carried by the oil passing through the ring to mix with the body of lubricating oil used in an engine, the rails being freed for independent action. The circumferential normal length of the spring 7 is such that in its free state it will hold the rails and the spacer member between them open at the parting as shown in Fig. 1. When the ring is closed at the parting, as when it is in piston ring grooves within the engine cylinder, the spring 7 is compressed and shortened circumferentially. The compression of the expander spring engenders forces tending to return it to its normal free position, and such forces act to force the rails 6 at their outer edges against a cylinder wall, bearing with a desired unit pressure thereagainst.

While I have shown a coiled spring member 7 other compressible springs of like length and resisting circumferential compression equivalent thereto have occurred to me and will occur to others skilled in the art, thus the invention is not limited to the particular specific coiled expander spring 7 which is shown and described.

Such expander spring is very quickly and easily installed in the channel spacer member.

With the structure described, a substantial tension is inherent in the closed piston ring. The spacer itself may be made of thinner material than in general use, enhancing the flexibility of the ring. Substantially all of the expanding force comes from the spring 7. In practice all parts of the piston ring are preferably made from steel but it is not required for the embodiment of my invention and the attainment of its results that all parts or any of them must necessarily be of steel.

The invention is defined in the appended claim and is to be considered comprehensive of all forms of structure coming within their scope.

I claim:

In a piston ring having two parted, circular, spaced, thin metallic rails, a vented, circular, parted spacer between the rails of channel cross section having an outer web and flanges extending inwardly from opposite edges of said web, and engaging means on said flanges at the inner edges of said rails, the improvement comprising, a circular, parted coiled circumferentially compressible spring seated in said spacer back of the web and between the flanges thereof having end coils of said spring at the parting thereof in abutting engagement, and a rod bridging the parting in said spring, said rod having opposite end portions inside the end portions of said spring at opposite sides of said parting, said spring grippingly securing the rod against movement relative to the spring.

References Cited in the file of this patent

UNITED STATES PATENTS

| | | |
|---|---|---|
| 1,240,170 | Block | Sept. 18, 1917 |
| 1,767,711 | Solenberger | June 24, 1930 |
| 2,229,578 | Malpas | Jan. 21, 1941 |
| 2,303,798 | Solenberger | Dec. 1, 1942 |

FOREIGN PATENTS

| | | |
|---|---|---|
| 486,217 | Canada | Sept. 2, 1952 |